(12) United States Patent
Hiller

(10) Patent No.: US 9,597,624 B2
(45) Date of Patent: Mar. 21, 2017

(54) ANGLE GRINDER WITH AIR INTAKE FILTER

(71) Applicant: Metabowerke GmbH, Nürtingen (DE)

(72) Inventor: Matthias Hiller, Altenriet (DE)

(73) Assignee: Metabowerke GmbH, Nurtingen (DE)

( * ) Notice: Subject to any disclaimer, the term of this patent is extended or adjusted under 35 U.S.C. 154(b) by 0 days.

(21) Appl. No.: 14/710,654

(22) Filed: May 13, 2015

(65) Prior Publication Data

US 2015/0328573 A1    Nov. 19, 2015

(30) Foreign Application Priority Data

May 13, 2014    (DE) .................... 10 2014 106 693

(51) Int. Cl.
*B01D 46/00* (2006.01)
*B24B 55/10* (2006.01)
(Continued)

(52) U.S. Cl.
CPC ........ *B01D 46/0005* (2013.01); *B24B 23/028* (2013.01); *B24B 55/00* (2013.01);
(Continued)

(58) Field of Classification Search
CPC ..... B24B 55/00; B24B 55/102; B24B 23/028; B01D 46/0005; B26D 7/1854; B23D 59/006; B25F 5/008; H02K 9/26
(Continued)

(56) References Cited

U.S. PATENT DOCUMENTS

| | | | | |
|---|---|---|---|---|
| 2,550,319 A | * | 4/1951 | Wright | .................... B24B 23/00 |
| | | | | 24/458 |
| 3,954,928 A | * | 5/1976 | Omori | ................ B01D 17/0202 |
| | | | | 264/210.1 |

(Continued)

FOREIGN PATENT DOCUMENTS

| | | |
|---|---|---|
| DE | 944976 | 6/1956 |
| DE | 1 030 443 | 5/1958 |

(Continued)

OTHER PUBLICATIONS

European Search Report dated Oct. 7, 2015.

*Primary Examiner* — Joseph J Hail
*Assistant Examiner* — Marc Carlson
(74) *Attorney, Agent, or Firm* — GrayRobinson, P.A.; Donald S. Showalter

(57) ABSTRACT

In a preferred embodiment, an angle grinder has a housing containing its electromotive drive, the housing having a free end from which an electric power cable extends, the free end having air intake openings via which cooling air is drawn into the housing. A filter assembly has a body and a filter medium supported by the body, the body being detachably attachable to the free end of the housing via, in some embodiments, latching projections. The body and the filter medium together form a projection-free outer face of the angle grinder when the filter assembly is attached to the free end of the housing. Air drawn into the air intake openings enters the filter assembly by way of the projection-free outer face and passes through the filter medium prior to being drawn into the air intake openings. The filter assembly may include a slotted opening through which the power cable extends.

4 Claims, 3 Drawing Sheets

(51) Int. Cl.
  *B25F 5/00* (2006.01)
  *B24B 23/02* (2006.01)
  *B24B 55/00* (2006.01)
  *H02K 9/26* (2006.01)

(52) U.S. Cl.
  CPC ............ *B24B 55/102* (2013.01); *B25F 5/008* (2013.01); *H02K 9/26* (2013.01)

(58) Field of Classification Search
  USPC ...................................... 451/359; 83/98, 169
  See application file for complete search history.

(56) References Cited

U.S. PATENT DOCUMENTS

| | | | |
|---|---|---|---|
| 4,491,297 A * | 1/1985 | Maier | B24B 23/026 138/113 |
| 5,948,127 A * | 9/1999 | Minakawa | B01D 46/002 55/283 |
| 8,398,465 B2 * | 3/2013 | Hoeschele | B24B 23/028 451/359 |
| 2010/0323593 A1 | 12/2010 | Hoeschele et al. | |
| 2014/0013730 A1 * | 1/2014 | Humburg | F01N 3/00 60/323 |

FOREIGN PATENT DOCUMENTS

| | | | | |
|---|---|---|---|---|
| DE | 10 2008 009 277 A1 | | 8/2009 | |
| DE | 102008009277 A1 | * | 8/2009 | ........... B24B 23/028 |
| DE | 10 2012 012 606 A1 | | 1/2014 | |
| DE | 102012012606 A1 | * | 1/2014 | ........... B23Q 11/127 |
| EP | 0752240 A1 | * | 1/1997 | ............. A61F 15/02 |
| JP | 2002283255 A | * | 10/2002 | |
| JP | 2013 049115 A | | 3/2013 | |

* cited by examiner

ANGLE GRINDER WITH AIR INTAKE FILTER

CROSS-REFERENCE TO RELATED APPLICATION

This application claims priority under 35 U.S.C. §119(a)-(d), to German Application No. 10 2014 106 693.6, filed May 13, 2014.

INCORPORATION BY REFERENCE

German Application No. 10 2014 106 693.6 is expressly incorporated herein by reference in its entirety to form a part of the present disclosure.

FIELD OF THE INVENTION

The present invention relates to a filter assembly for attachment to an angle grinder, and to a corresponding angle grinder with filter assembly.

BACKGROUND OF THE DISCLOSURE

Electrically powered hand tool of all types, in particular angle grinders, generally require an air cooling of the electromotive drive components which are accommodated in the housing of the electrically powered hand tool. Accordingly, in the region of the electromotive drive, there are provided on the housing ventilation openings or air intake openings, through which cooling air can be sucked from outside into the housing. In particular in electrically powered hand tools, such as angle grinders which are used for metal working, in particular for chip-forming or abrasive metal working, the problem here arises that, with the sucked-in cooling air, magnetizable dirt and dust particles are also sucked into the housing interior, which particles can lead to unwelcome abrasion and attachment to the magnetic components of the electric motor. This can cause considerable damage to the drive components, and thus also to the electrically powered hand tool.

From the prior art, it is therefore known to fit filter mediums, by means of which magnetizable dust, in particular, can be kept away from the electromotive drive components, in the region of the air intake openings. An appropriate solution is found, for instance, in German Offenlegungsschrift DE 10 2008 009 277 A1 or patent specification DE 10 30 443 B.

However, the solution which is shown there can have the drawback for a user that, in order to clean the filter medium, he has to detach this, together with the filter assembly, from the machine.

BRIEF SUMMARY OF THE INVENTION

The object of the present invention is therefore to further improve the known solution and to enable simple and rapid cleaning of the filter medium.

This is achieved according to the invention by a filter assembly having a filter medium which, in the mounted state, forms a projection-free outer face of the angle grinder in the region of the air intake openings.

Unlike in the prior art, the filter medium is thus not fitted between a structure of the filter assembly and the housing of the angle grinder, but itself forms an outer face of the angle grinder. Since this outer face is additionally configured free from projections, that is to say without notches, indentations or the like, the filter medium can be cleaned readily, in particular without additional steps, by simple wiping over with a piece of cloth, a glove or the like. In the region of the filter medium, an almost bulge-free surface is thus formed, which at most can be slightly curved, bent or the like. Thus the filter fabric or filter medium itself forms a coherent projection.

In the solutions known from the prior art, an appropriately simple cleaning is not possible, however, for lack of a filter medium which forms a projection-free outer face. Thus, in the solution of DE 10 2008 009 277 A1, the filter paper is arranged offset in relation to the half-shell-shaped filter structure in the direction of flow. Thus the outer face is formed not only by the filter paper, but in some areas also by the filter structure. The latter thus forms, in the region of the openings which release the filter paper, niches in which dust can settle. This dust cannot be removed again by simple wiping off, but remains in the niches and clogs parts of the filter area. The same applies to the solution shown in DE 10 30 443 B, in which the filter material is likewise arranged offset in relation to the steel plate casing in the direction of the airflow. Here too, this results in dust deposits on the steel plate casing, which cannot be readily removed and adversely affect the active filter area.

In the solutions of the prior art, the structure of the filter assembly thus forms projections in relation to the filter material, which hinder direct accessibility to the filter and thus make cleaning of the filter significantly more difficult.

An advantageous quick and uncomplicated cleaning is made possible only by the filter medium, in the solution according to the invention, itself forming the outer face and having no projections at all, for instance formed by struts or frame parts of the filter assembly.

The filter medium and the filter assembly can also be configured integrally with each other. It is thus conceivable, for instance, that the filter assembly, in the manner of a frame, tents, the filter medium which is glued or injection molded onto the filter assembly.

The filter assembly can further comprise fastening means for detachable fastening to the angle grinder housing. For instance, these can be latching projections or the like, by means of which the filter assembly is clipped onto the housing of the angle grinder. Alternatively, it is however likewise conceivable to screw the filter assembly, together with the filter medium, to the angle grinder housing.

The filter medium can have a reticular structure with a mesh size of, for instance, 0.1 to 0.2 mm and a mesh count of 50 to 150 threads, preferably of about 100 threads per inch. In particular, the filter medium can be made of special steel, since this material provides particularly good processing and, at the same time, a secure filter structure. A filter medium made of special steel can in particular have sufficient stiffness to make the provision of further stiffening structures on the filter assembly superfluous.

In addition to the filter assembly, the present invention also proposes an angle grinder having a housing for receiving electromotive drive components, wherein the housing has air intake openings for the intake of outside air which cools the electromotive drive components, and further comprises a filter assembly having the above-described features.

The filter assembly can here be placeable onto the housing from outside. This enables it, in particular, also to be retrofitted in angle grinders which are already known.

Furthermore, the filter assembly can, in particular, be clippable onto the housing of the angle grinder and be latchable in a back-gripping position. Such a clip-on operation can be performed particularly easily, by the filter assembly, for instance, being pressed manually in the direction of its intended position. The filter assembly then slides in accordance with the contour of the housing body over the appropriate housing portion containing the air intake openings, whereupon it, for instance, widens somewhat and then snaps into a stable position. For the detachment or opening of the filter assembly, a user can again strip off the filter assembly in the opposite direction, with slight elastic expansion of the filter assembly. To this end, the filter assembly can be of at least partially elastic configuration.

Furthermore, the filter medium can form a substantially projection-free outer face of the angle grinder in the region of the air intake openings, which outer face, over the entire area of the filter medium, can be used actively to filter the cooling air. Since the filter assembly has neither has to provide a stiffening structure beneath the filter medium, nor to overlap this in the mounted position, the entire area of the filter medium serves actively to filter the cooling air, whereby a particularly efficient filter medium can be provided.

Further advantages and details of the present invention become clear from the following description of a preferred embodiment, which is more closely described in connection with the appended figures. The figures here show only a conceivable illustrative embodiment, in which several features of the invention are represented in combination with one another. The person skilled in the art will also however view these separately from one another and, where appropriate, can group them into further suitable combinations or subcombinations without having to engage in inventive activity.

BRIEF DESCRIPTION OF THE DRAWINGS

In the Figures, in schematic representation:

FIGS. 1 to 3 show a portion of an electrically powered hand tool, on which a filter assembly according to the invention is fitted. The electrically powered hand tool is constituted, in particular, by an angle grinder, only that end of the angle grinder which is facing away from the tool being shown. Said angle grinder is denoted in general terms by the reference numeral 10 and comprises a housing 12, from inside of which runs an electric cable 14. On the housing 12, at its free end 18, are further provided ventilation slots or air intake openings 16, via which cooling air drawn into the interior of the housing 12 can be used to air-cool the drive components (not shown) accommodated therein.

Figure 1:
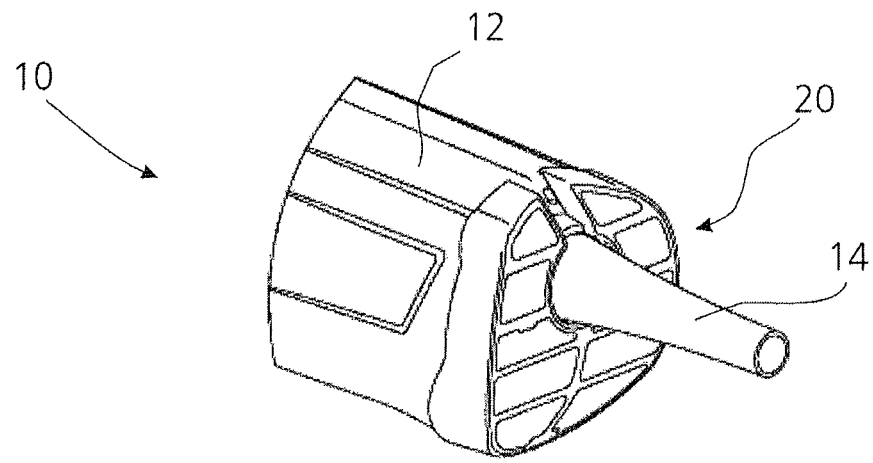
FIG. 1 shows a partial view of an electrically powered hand tool with an inventive filter assembly in isometric representation.
Figure 2:
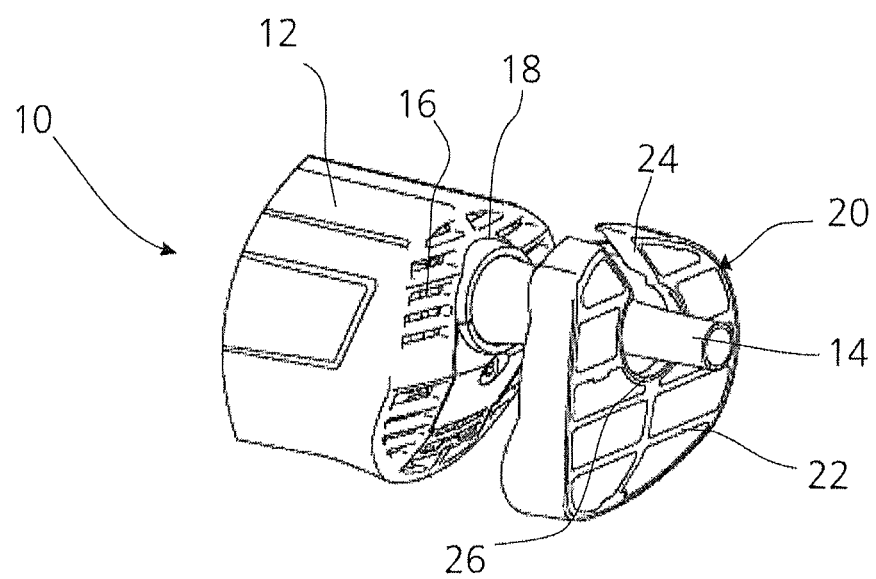
FIG. 2 shows a partial view of the electrically powered hand tool according to FIG. 1, wherein the filter assembly is detached from the housing of the electrically powered hand tool.

Onto the free end 18 of the housing 12, in the region of the air intake openings 16, can be placed according to the invention a filter assembly 20. In the shown embodiment, this is designed to be clippable onto the housing body 12. The filter assembly 20 comprises a shell-shaped plastics body, which is delimited by side cheeks 28 and which on an outer face 22 has stiffening webs 32. The plastics body of the filter assembly 20 further comprises a slot-shaped recess 24, which opens out into a circular recess 26. Extending through the latter, in the mounted state, is the electric cable 14 of the electrically powered hand tool 10.

The outer face 22 is further formed by a reticular filter medium, which in the mounted state of the represented embodiment terminates flush with the webs 32 and thereby forms, together with the plastics body of the filter assembly, a substantially projection-free outer face 22 of the angle grinder 10 in the region of the air intake openings 16. Due to this specific configuration of the filter assembly 20, it is possible, for instance with a work glove, to easily wipe over the outer face 22 of the filter assembly 20 in order to clean this. By contrast, in filter assemblies known from the prior art it is disadvantageous however that, particularly in the region of projections on the outer face of such a filter assembly, dirt deposits can barely be removed, or only with great effort. Thus, in the filter assembly according to the invention, full use is made of the available filter area and inactive or dirtied portions of the filter assembly can be avoided.

The reticular filter medium 30 can be configured integrally with the filter assembly 20. It is thus conceivable, for instance, that the filter assembly, in the manner of a frame, tents, the filter medium 30 between the webs 32, wherein the filter medium 30 can be glued on the filter assembly or injection molded onto it. Alternatively, the filter medium can however rest on the webs or cover these over from the outside.

Figure 3:
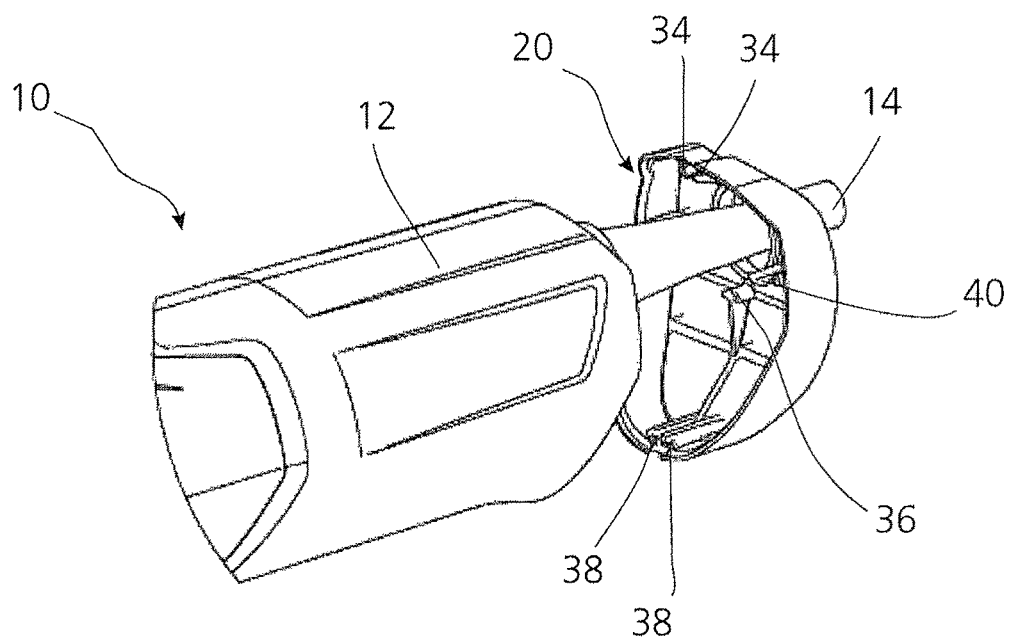
FIG. 3 shows the arrangement according to FIG. 2 in a turned representation.
Figure 4:
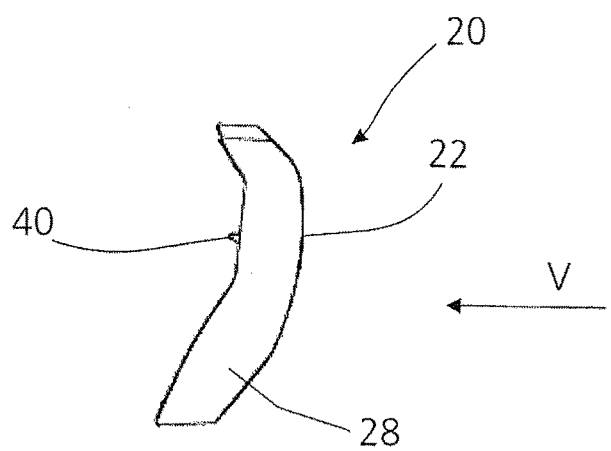
FIG. 4 shows the inventive filter assembly of FIGS. 1 to 3 in a side view.
Figure 5:
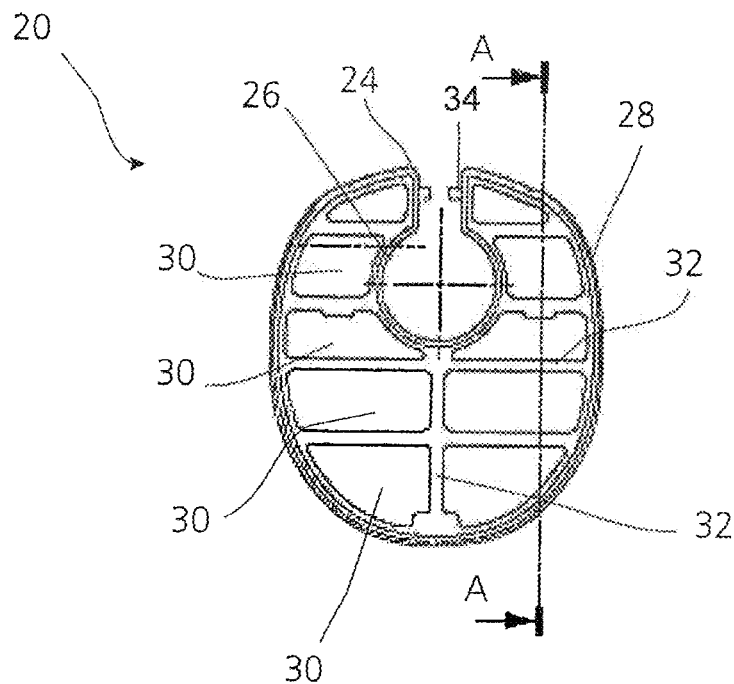
FIG. 5 shows a top view of the inventive filter assembly of FIG. 4 according to the arrow direction V.
Figure 6:
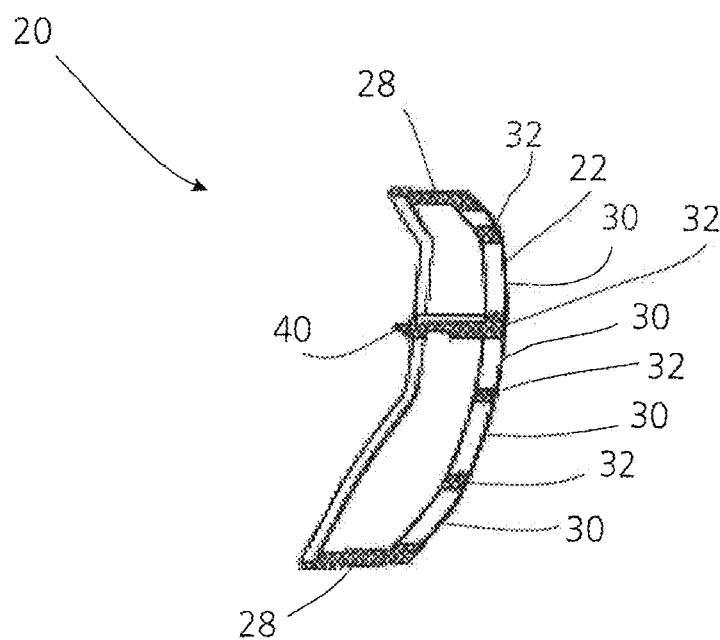
FIG. 6 shows a sectional view of the inventive filter assembly along the line A-A of FIG. 5.

As can be seen in particular in FIGS. 3, 5 and 6, the filter assembly 20 can comprise fastening means for detachable fastening to the angle grinder housing 12. In the represented illustrative embodiment are provided centerings 34, 36 and 38 and latching projections 40, which can be latched into corresponding recesses on the free end 18 of the angle grinder housing 12 in order to clip the filter assembly onto the housing 12.

In order to simplify the Figures, the reticular structure of the filter medium 30 is not represented. This can have in particular a mesh size of about 0.1-0.2 mm and a mesh count of 50 to 150 threads per inch, preferably of about 100 threads per inch. Furthermore, the filter medium can be made, for instance, of special steel, since this material provides particularly good processing and, at the same time, a secure filter structure. In particular, a filter medium made of special steel could have sufficient stiffness to make it possible to dispense with further stiffening structures, for instance in the form of webs 32. In this way, a still more efficient filter assembly, in which the entire filter surface or outer face can be used actively to filter the cooling air, could be provided.

While the foregoing constitute preferred embodiments of the invention according to the best mode presently contemplated by the inventors of making and carrying out the invention, it is to be understood that the invention is not limited to the particulars described above. In light of the present disclosure, various alternative embodiments and modifications will be apparent to those skilled in the art. Accordingly, it is to be recognized that changes can be made without departing from the scope of the invention has particularly pointed out and distinctly claimed in the appended claims as properly construed to include all legal equivalents.

What is claimed is:

1. An electrically powered angle grinder comprising:

a housing having a free end from which an electric power cable extends, the housing having recesses formed therein;

an electromotive drive disposed in the housing, the free end of the housing having air intake openings via which air is drawn into the housing to cool components of the drive when the angle grinder is in operation;

a detachable filter assembly which includes a body, a filter medium supported by the body, and latching projections connected to the body, the latching projections cooperating with the recesses for detachably attaching the filter assembly to the free end of the housing;

the body and the filter medium together forming a projection-free outer face of the angle grinder when the filter assembly is attached to the free end of the housing by way of the latching projections and the air drawn into the air intake openings enters the filter assembly by way of the projection-free outer face and passes through the filter medium prior to being drawn into the air intake openings in the free end of the housing, the body including a circular recess and a slot-shaped recess, the slot-shaped recess having a first end open to the exterior of the filter assembly and a second end which joins the circular recess, the slot-shaped recess permitting the filter assembly to straddle the electric power cable whereby the electric power cable can pass from the exterior of the filter assembly into the circular recess by way of the slot-shaped recess, the electric power cable extending through the circular recess when the filter assembly is attached to the free end of the housing.

2. An angle grinder as claimed in claim 1 wherein the filter medium has a reticular structure with a mesh size of about 0.1 to 0.2 mm.

3. An electrically powered angle grinder as claimed in claim 1 wherein the filter medium extends over the entirety of the projection-free outer face and wherein the entirety of the projection-free outer face filters the air.

4. An electrically powered angle grinder as claimed in claim 1 wherein the filter assembly is of an at least partially elastic configuration.

* * * * *